United States Patent

Maury et al.

[11] Patent Number: 6,068,826
[45] Date of Patent: May 30, 2000

[54] METHOD FOR REDUCING THE AMOUNT OF CHLORIDE COMPOUNDS PRODUCED IN A KILN FOR FIRING CEMENT CLINKER

[75] Inventors: Hans-Dietmar Maury, Hindemithstrasse 5, D-59227 Ahlen; Bernold Kraft, Ahlen, both of Germany

[73] Assignee: Hans-Dietmar Maury, Germany

[21] Appl. No.: 09/070,135

[22] Filed: Apr. 29, 1998

[30] Foreign Application Priority Data

Apr. 29, 1997 [DE] Germany ............... 197 18 017

[51] Int. Cl.⁷ .................. C04B 7/60; B01D 53/00
[52] U.S. Cl. ............ 423/420 R; 106/745; 106/750; 106/752; 106/761; 423/499.1
[58] Field of Search .................. 106/750, 752, 106/761, 745; 423/240 R, 497, 499.1

[56] References Cited

U.S. PATENT DOCUMENTS

| | | | |
|---|---|---|---|
| 3,044,756 | 7/1962 | Grebe et al. ................. | 106/752 |
| 3,887,388 | 6/1975 | Christiansen ................ | 106/747 |
| 3,973,980 | 8/1976 | Rohrbach et al. ............ | 106/750 |
| 4,115,137 | 9/1978 | Nudelman et al. ........... | 106/740 |
| 4,126,471 | 11/1978 | Herchenbach et al. ....... | 106/747 |
| 4,162,922 | 7/1979 | Herchenbach ................ | 106/752 |
| 4,329,180 | 5/1982 | Herchenbach et al. ....... | 106/752 |
| 4,465,520 | 8/1984 | Jehmlich et al. ............. | 106/752 |
| 4,541,245 | 9/1985 | Becker et al. . | |
| 4,850,290 | 7/1989 | Benoit et al. ................ | 110/346 |
| 5,454,715 | 10/1995 | Hansen et al. . | |

FOREIGN PATENT DOCUMENTS

| | | | |
|---|---|---|---|
| 2 109 491 | 5/1972 | France . | |
| 1471279 | 11/1968 | Germany ................ | 106/752 |
| 2052653 | 5/1971 | Germany ................ | 106/752 |
| 2 126 121 | 12/1972 | Germany . | |
| 27 46 331 | 4/1978 | Germany . | |
| 86 07104 | 12/1986 | WIPO . | |

OTHER PUBLICATIONS

Translation of DE 2,746,331, Apr. 1978.
Translation of DE 2,126,121, Dec. 1972.
Translation of FR 2,109,491, May 1972.

*Primary Examiner*—Ngoc-Yen Nguyen
*Attorney, Agent, or Firm*—Robert W. Becker & Associates

[57] ABSTRACT

In a method for reducing the amount of chloride components in cement clinker kilns at least a portion of the chloride-containing gases is removed from the kiln chamber. The gases are guided into a condenser whereby the gas temperature is maintained at a value above the condensation temperature of the chloride components. The chloride components are then cooled on cooled condensation surfaces of the condenser to a value below the condensation temperature. The cleaned gases are removed from the condenser and preferably returned into the kiln chamber. The condensation surfaces are continuously or discontinuously cleaned, and the removed chloride crystals are taken out of the condenser.

9 Claims, 1 Drawing Sheet

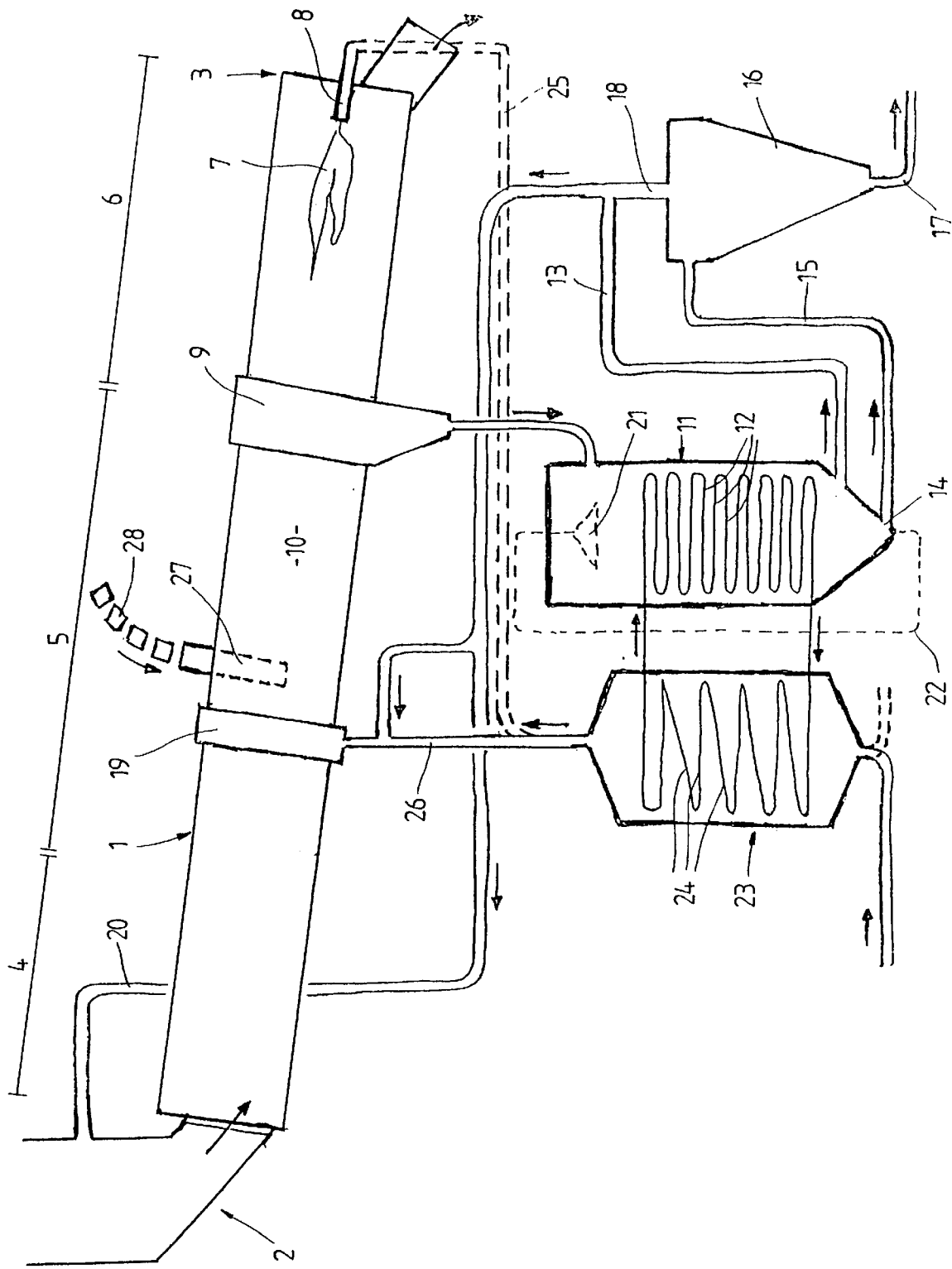

6,068,826

METHOD FOR REDUCING THE AMOUNT OF CHLORIDE COMPOUNDS PRODUCED IN A KILN FOR FIRING CEMENT CLINKER

BACKGROUND OF THE INVENTION

The present invention relates to a method for reducing the amount of chloride compounds produced in a kiln for firing cement clinker. A basic operational problem of such kilns for firing cement clinker is at chlorine compounds are introduced into the firing chamber which originate from the raw material as well as the fuel. The chlorine compounds when they reach a temperature below their condensation temperature will deposit or surfaces and can result in disruptions of proper operation of the device. Chlorine introduction is especially disadvantageous in the production of cements with low alkali contents. Such cements are thus produced exclusively by employing raw materials and fuels of low chloride contents. For reducing operational costs it is desired to also be able to use raw materials and fuels of higher chloride contents for the production of cements of standard quality as well as for the production of low alkali cement. Only in this manner is it possible to employ waste as a secondary fuel in higher amounts than in the prior art.

In cement clinker firing processes with increased chloride contents it is known to install by-pass systems with which the operational disturbance caused by the furnace heat exchanger system can be reduced. However, this results in other disadvantages. On the one hand, by-pass systems increase the specific energy consumption of the device. On the other hand, for reasons of quality standards, the produced dust amounts cannot be added to the cement end product so that often disposal of the produced large amounts of dust is required either in quarries or in landfills. For processing dust having a high chloride contents with a weight proportion of the chloride compounds of more than 20% as well as for the manufacture of especially low alkali cements such conventional by-pass systems are therefore not suitable.

It is therefore an object of the present invention to provide a method for reducing the amount of chloride compounds produced in cement clinker kilns which allows to employ inexpensive raw materials and fuels, having a chloride contents higher than average, for the production of standard as well as low alkali cements.

SUMMARY OF THE INVENTION

The inventive method for reducing the amount of chloride compounds produced in a kiln for firing cement clinker is primarily characterized by the following steps:
 a) removing at least a portion of chloride containing gases from the kiln chamber;
 b) feeding the removed gases to a condenser while maintaining the temperature of the removed gases at a value above a condensation temperature of the chloride compounds;
 c) cooling the chloride compounds on cooling surfaces of the condenser to a value below the compensation temperature;
 d) guiding the cleaned gases out of the condenser;
 e) cleaning the cooling surfaces of the condenser from condensed chloride crystals and removing the cleaned-off chloride crystals.

Advantageously, the step d) includes returning the cleaned gases into the kiln chamber.

Preferably, in step e) the cooling surfaces of the condenser are cleaned continuously or intermittently.

Advantageously, the step c) includes supplying a primary heat-absorbing medium to the cooling surfaces of the condenser.

Preferably, the primary heat-absorbing medium is oil that, after heat absorption, is guided into the burner of the kiln as a primary fuel.

Preferably, the primary heat-absorbing medium is air that, after heat absorption, is supplied as secondary combustion air into the burner of the kiln.

Advantageously, the air is guided into an inlet for secondary fuel extending into the kiln chamber.

Preferably, the secondary fuel is derived from waste.

An intermediate heat-absorbing medium is provided and the primary head-absorbing medium indirectly absorbs the heat from the cooling surfaces of the condenser via the intermediate heat-absorbing medium flowing through the surfaces of the condenser.

Advantageously, the intermediate heat-absorbing medium is a thermal oil having a boiling point of up to 500° C.

The step d) preferably includes returning the cleaned gases directly into the kiln chamber.

The step d) includes guiding the cleaned gases to an outlet of the kiln.

The step e) may also include providing the kiln with a mechanically operating cleaning device. The cleaning device is preferably a ball dropping device including a ball distributor above the cooling surfaces of the condenser and a return device for moving the balls collecting at the bottom of the condenser to the ball distributor.

Thus, the present invention is characterized by removing at least a portion of the chloride-containing gases from the kiln chamber. These gases are then guided into a condenser whereby the gas temperature is maintained at a value above the condensation temperature of the chloride compounds. The chloride compounds are then cooled on cooling surfaces of the condenser to a value below the condensation temperature. The thus cleaned gases are removed from the condenser and preferably returned into the kiln chamber. Cleaning of the cooling or condensation surfaces is performed continuously or discontinuously (intermittently) and the removed condensed chloride crystals are removed from the condenser.

Inventively, at least a portion of the chloride-containing gases is removed from the kiln chamber. This is carried out at a suitable location of the kiln chamber between the sintering and the calcination area. The temperature of the gases is in the range of 900° C. to 1200° C., preferably at 1100° C. The removed gases which contain a large amount of chloride compounds are then guided to a condenser whereby with suitable means the gas temperature is maintained at a value above the condensation temperature. Preferably, the temperature upon entering the condenser should not be below 850° C. The chloride compounds are then cooled at the cooled condensation or cooling surfaces of the condenser to a value below the condensation temperature. The chloride compounds crystalize directly at the condensation surfaces having a surface temperature in a range between 300° C. and 400° C. by use of a suitable cooling medium. Inventively, the deposition of the chlorine compounds is effected by a large temperature gradient. This temperature gradient between the gas temperature and the temperature at the relatively cold condensation surfaces is between 700° C. and 800° C. which results in a very sudden crystallization of the chloride particles at the condensation surfaces.

The cleaned gases are subsequently removed from the condenser, preferably by a return line that extends directly or indirectly into the kiln chamber. In order to remove the chloride crystals which form a crust on the condensation surfaces, a continuous or discontinuous (intermittent) cleaning of the condensation surfaces is performed. The chloride crystals removed from the condensation surfaces can be removed from the condenser, disposed of in a suitable manner or can be used in speciality products.

BRIEF DESCRIPTION OF THE DRAWING

The object and advantages of the present invention will be explained in the following with the aid of the only drawing showing schematically a cement clinker kiln.

DESCRIPTION OF PREFERRED EMBODIMENT

The present invention will now be explained in detail with the aid of the only drawing.

The cement clinker kiln represented in the drawing employs as a kiln chamber an elongate (cylindrical) rotary furnace 1 which in a conventional manner is rotatably supported about its axis and is arranged with its axis at a slant so that the raw material in the form of a powder, supplied via the inlet 2, will be transported continuously along the mantle surface of the rotary furnace 1 to its end 3 where the burner is located. In a conventional manner, the length of the rotary furnace 1 includes a drying and pre-heating zone 4, a calcination zone 5, and a sintering zone 6. A flame 7 of burner 8 is introduced into the sintering zone 6. The burner 8 can be operated with a primary fuel, i.e., oil, coal, or gas, but also with secondary fuels such as waste.

In the following, the invention will be explained with the rotary furnace as an example, which is not to be taken as a limitation of the invention. The inventive method in the same manner is applicable also in connection with calcination or sintering furnaces operating with a heat exchanger.

The represented device is suitable for processing raw materials and fuels with relatively high chloride contents, for example, as a result of the composition of the fuel. When the burner 8 exclusively burns oil, the chloride contents in the gases that are formed is relatively low. However, when secondary fuels are burned, which are based on waste material, the contents of chloride compounds in the gas can be greatly increased. At least a portion of the gases containing these chlorine compounds are removed by the removal device 9 positioned between the calcination zone 5 and the sintering zone 6 of the kiln chamber 10. The temperature of the gas is approximately 1100° C. The gases are then guided on the shortest possible path into the condenser 11 and flow through it from the top to the bottom. The condenser 11 comprises condensation or cooling surfaces 12, which are maintained at a temperature between 300° C. 400° C. or even lower by a cooling medium. When the gases pass the condensation surfaces 12 the chloride compounds will crystalize directly on the condensation surfaces 12. This process is very sudden because the temperature gradient between the gases entering the condenser 11 at a temperature of at least 850° and the temperature of the condensation surfaces is at least 700° C. to 800° C.

The cleaned gases exit the lower end of the housing of the condenser and are introduced via the line 13 into the kiln chamber 10. At the lower end of the condenser housing an outlet 14 is provided for the dust as well as the chloride compounds which are crystalized and also dust-like. The dust and chloride compounds are guided via line 15 into a separator 16 which in the disclosed embodiment is a cyclone separator. The solid material 17 exits the separator 16 in the form of a highly concentrated chloride dust. The gas portions exit the separator 16 via the immersion tube 18 and enter via the extension of the line 13 the kiln chamber 10 of the device.

For returning the cleaned gases two alternatives are represented in the drawing. In the first alternative the gases are guided via a supply device 19 surrounding the rotary kiln 1 into the kiln chamber 10. As an alternative, the cleaned gases can be guided via a separate line 20 to the inlet of the kiln.

The crystallization of the chloride compounds directly at the condensation surfaces 12 results in a continuous collection of crystal layers. For cleaning, the condenser 11 is provided with a ball dispensing cleaning system in which metal balls are introduced by a ball distributor 21 arranged above the condensation surfaces 12 into the condensation chamber. The balls impinge on the condensation surfaces 12 and thus mechanically clean them whereby the solid chloride particles due to gravity forces and gas flow are guided in the downward direction toward the outer 14. This holds true also for the balls which in the vicinity of the exit 14 are separated from the chloride particles and returned by a ball transporting device 22 back to the ball distributor 21. The mechanical impact of the balls will result in the chloride crystals being collected in a substantially powder-like state in the vicinity of the outlet 14 where they are removed, together with the other dust particles, and guided into the separator 16.

For absorbing the heat energy, respectively, condensation heat in the condenser 11, a heat exchanger 23 is provided. As a primary medium air or, alternatively, oil, flows through the heat exchanger 23. The heat exchanger surfaces 24 of the heat exchanger 23 have a secondary medium flowing therethrough, preferably, a thermal oil with a boiling point of up to 500° C. which is circulated also through the condensation surfaces 12 of the condenser 11 in order to cool the condensation surfaces 12 to 300° C. to 400° C. In this manner, the heat energy transmitted to the secondary medium by the condenser is then transmitted by the heat exchanger 23 onto the air or the oil guided therethrough and the primary medium is thus heated.

In this manner, the heat energy within the heat exchanger 23 can be used to preheat the oil introduced into the burner 8 for which purpose an oil supply line 25 extends from the heat exchanger 23 to the burner 8.

Alternatively, the primary medium may be air which is guided through the heat exchanger 23. This air is then guided by the air supply line 26 and the supply device 19 as a preheated secondary combustion air into the kiln chamber 10. The supply device 19 is positioned within the calcination zone 5 of the rotary furnace and preferably in the vicinity of an additional fuel supply inlet 27. The fuel supply inlet 27 allows for the introduction of block-shaped compressed waste 28 as a secondary fuel to be introduced directly into the calcination zone 5 of the rotary furnace. The basic design of such a fuel inlet 27 is known from U.S. Pat. No. 4,850,290, the disclosure of with is herewith incorporated by reference. Embodiments of removal devices 9 annularly surrounding the rotary furnace as well as supply devices 19 also annularly surrounding the rotary furnace are known from U.S. Pat. No. 5,454,715, the disclosure of which is herewith incorporated by reference, and therefore need no further discussion.

Inasmuch as the gases removed via the removal device 9 from the kiln chamber contain dust resulting from the calcination, respectively, sintering process, these dust particles are guided through the condenser 11 and along the condensation surfaces 12. The dust particles together with the also dust-like chloride crystals reach the lower outlet 14 of the condenser 11 and are collected in the separator 16 as solid removal material 17. This solid removal material is a highly concentrated chloride dust with a weight proportion of chloride components in the total amount of dust of at least 20%.

The specification incorporates by reference the disclosure of German priority document 197 18 017.5 of Apr. 29, 1997.

The present invention is, of course, in no way restricted to the specific disclosure of the specification and drawings, but also encompasses any modifications within the scope of the appended claims.

What is claimed is:

1. A method for reducing the amount of chloride compounds produced in a kiln chamber for firing cement clinker bricks, said method comprising the steps of:

a) removing at least a portion of chloride containing gases from the kiln chamber;

b) feeding the removed gases to a condenser while maintaining the temperature of the removed gases at a value above condensation temperatures of the chloride compounds, wherein the condenser is connected to a heat exchanger;

c) cooling the chloride-containing gases on cooling surfaces of the condenser, cooled by an intermediate heat absorbing medium, to a value below the condensation temperatures of the chloride compounds to form chloride crystals on the cooling surfaces of the condenser, passing the intermediate heat absorbing medium from the condenser to the heat exchanger and passing air as a primary heat-absorbing medium through the heat exchanger to indirectly absorb the heat from the intermediate heat absorbing medium;

d) guiding the cleaned gases out of the condenser and guiding the air after heat absorption as secondary combustion air into the kiln chamber in the vicinity of a secondary fuel inlet;

e) cleaning the cooling surfaces of the condenser from condensed chloride crystals and removing the cleaned-off chloride crystals from the condenser.

2. A method according to claim 1, wherein said step d) includes returning the cleaned gases into the kiln chamber.

3. A method according to claim 1, wherein in said step e) the cooling surfaces of the condenser are cleaned continuously or intermittently.

4. A method according to claim 1, wherein a secondary fuel supplied via the secondary fuel inlet is derived from waste.

5. A method according to claim 1, wherein the intermediate heat-absorbing medium is a thermal oil having a boiling point of up to 500° C.

6. A method according to claim 1, wherein said step d) includes returning the cleaned gases directly into the kiln chamber.

7. A method according to claim 1, wherein said step d) includes guiding the cleaned gases to an outlet of the kiln.

8. A method according to claim 1, wherein a mechanically operating cleaning device is used for cleaning the cooling surfaces in step e).

9. A method according to claim 8, wherein the cleaning device is a ball dropping device including a ball distributer above the cooling surfaces of the condenser and a return device for moving the balls collecting at the bottom of the condenser to the ball distributer.

* * * * *